United States Patent
Wang et al.

(10) Patent No.: US 10,588,189 B2
(45) Date of Patent: Mar. 10, 2020

(54) BACKLIGHT MODULE COMPRISING VIEW ANGLE CONTROLLER, CONTROL METHOD AND CONTROL DEVICE THEREOF

(71) Applicant: BOE TECHNOLOGY GROUP CO., LTD., Beijing (CN)

(72) Inventors: Xin Wang, Beijing (CN); Fan Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 237 days.

(21) Appl. No.: 15/563,577

(22) PCT Filed: May 2, 2017

(86) PCT No.: PCT/CN2017/082722
§ 371 (c)(1),
(2) Date: Sep. 30, 2017

(87) PCT Pub. No.: WO2017/215360
PCT Pub. Date: Dec. 21, 2017

(65) Prior Publication Data
US 2018/0199406 A1    Jul. 12, 2018

(30) Foreign Application Priority Data
Jun. 17, 2016 (CN) .......................... 2016 1 0439841

(51) Int. Cl.
*H05B 33/08* (2020.01)
*G02F 1/1335* (2006.01)
*G02F 1/13357* (2006.01)

(52) U.S. Cl.
CPC ....... *H05B 33/0845* (2013.01); *G02F 1/1336* (2013.01); *G02F 1/133603* (2013.01);
(Continued)

(58) Field of Classification Search
CPC ............... H05B 33/0845; G02F 1/1336; G02F 1/133603; G02F 1/133605; G02F 1/133606; G02F 2001/133626
(Continued)

(56) References Cited

U.S. PATENT DOCUMENTS

2012/0212975 A1* 8/2012 Masuda ................. G02B 6/001
                                                        362/606
2017/0285252 A1  10/2017 Chen et al.

FOREIGN PATENT DOCUMENTS

CN   105487292 A   4/2016
CN   105652363 A   6/2016
(Continued)

OTHER PUBLICATIONS

Search Report for International Chinese Patent Application No. PCT/CN2017/082722 dated Jun. 29, 2017.

*Primary Examiner* — Anh T Mai
*Assistant Examiner* — Hana S Featherly
(74) *Attorney, Agent, or Firm* — Calfee, Halter & Griswold LLP

(57) ABSTRACT

A backlight module, a control method and control device thereof, and a corresponding display device are disclosed. With this backlight module, switching between a narrow view angle and a wide view angle is achieved without the additional need for carrying any auxiliary tools. A light exit region of the backlight module includes a first light exit region and a second light exit region located on a periphery of the first light exit region. The backlight module includes a first light source component and a second light source component. Light emitted from the first light source component is emitted out through the first light exit region, and light emitted from the second light source component is at least partially emitted out through the second light exit (Continued)

region. Switch control ends for the first light source component and the second light source component are not electrically connected.

16 Claims, 5 Drawing Sheets

(52) U.S. Cl.
CPC .. *G02F 1/133605* (2013.01); *G02F 1/133606* (2013.01); *G02F 2001/133626* (2013.01)

(58) Field of Classification Search
USPC ........................................................ 362/97.3
See application file for complete search history.

(56) References Cited

FOREIGN PATENT DOCUMENTS

| | | |
|---|---|---|
| CN | 105974663 A | 9/2016 |
| CN | 205670225 U | 11/2016 |
| JP | 2008300206 A | 12/2008 |
| JP | 2011007892 A | 1/2011 |

* cited by examiner

BACKLIGHT MODULE COMPRISING VIEW ANGLE CONTROLLER, CONTROL METHOD AND CONTROL DEVICE THEREOF

The present application is the U.S. national phase entry of PCT/CN2017/082722, with an international filling date of May 2, 2017, which claims the benefit of priority from the Chinese patent application No. 201610439841.1 filed on Jun. 17, 2016, the disclosures of which are incorporated herein by reference.

FIELD

This disclosure relates to the field of display technologies, and in particular to a backlight module, a control method and a control device thereof, and a corresponding display device.

BACKGROUND ART

With the increasing development of display technologies, portable electronic devices such as smart phones and tablet computers are becoming more and more popular. In this case, people have more chances and time to use communication software, browse web pages or process emails in public. However, when in public places, such as on a public transport vehicle, if a portable electronic device is used, image information on the screen will probably be seen by a neighboring passenger. This easily causes leakage of private information of the user such as personal data or private passwords.

In traditional approaches, privacy glasses can be used in order to prevent other people from peeping. In this way, the user cannot clearly see images displayed on the portable electronic device until he/she wears the privacy glasses. Besides, a cover part arranged on the portable electronic device can be further used to cover circumferential regions of the display screen so as to narrow the view angle. However, both approaches need to additionally resort to auxiliary tools, which reduces the user's convenience in use.

SUMMARY

Embodiments of this disclosure provide a backlight module, a control method and control device thereof, and a corresponding display device, so as to achieve switching between a narrow view angle and a wide view angle without the additional need for carrying any auxiliary tools.

According to one aspect of this disclosure, a backlight module is provided. A light exit region of the backlight module comprises a first light exit region (hereinafter also referred to as an initial view angle region) and a second light exit region (hereinafter also referred to as a view angle compensation region) located on a periphery of the first light exit region. Such a backlight module comprises a first light source component and a second light source component. Light emitted from the first light source component is emitted out through the first light exit region, i.e., the initial view angle region. Light emitted from the second light source component is emitted out at least partially through the second light exit region, i.e., the view angle compensation region. Besides, a switch control end for the first light source component and a switch control end for the second light source component are not electrically connected.

In certain exemplary embodiments, the backlight module mentioned above further comprises a view angle controller arranged within the initial view angle region. Light emitted from the first light source component is emitted into the view angle controller and emitted out from a light exit side of the view angle controller as parallel light.

In certain exemplary embodiments, the first light source component comprises a first light guide unit, and a first sub-light source arranged at a light entrance side of the first light guide unit. Such a first light guide unit further comprises a first microstructure. The first microstructure is arranged on a side of the first light guide unit facing away from the view angle controller, and configured to redirect light received from the first sub-light source towards the first light exit region.

In certain exemplary embodiments, the second light source component comprises a second light guide unit, and a second sub-light source arranged at a light entrance side of the second light guide unit. Such a second light guide unit further comprises a second microstructure. The second microstructure is arranged on a side of the second light guide unit facing away from the view angle controller, and configured to redirect at least part of light received from the second sub-light source towards the second light exit region.

In certain exemplary embodiments, the second light source component comprises a second light guide unit, a second sub-light source arranged at a light entrance side of the second light guide unit, and a third light guide unit arranged on a side of the second light guide unit facing away from the view angle controller. The second light guide unit further comprises a second microstructure. The second microstructure is arranged on a side of the second light guide unit close to the view angle controller, and configured to redirect light received from the second sub-light source towards the third light guide unit. Besides, the third light guide unit further comprises a third microstructure. The third microstructure is arranged on a side of the third light guide unit facing away from the view angle controller, and configured to redirect at least part of light received from the second light guide unit towards the second light exit region.

In certain exemplary embodiments, the first light source component comprises a plurality of light-emitting devices distributed evenly. Furthermore, the second light source component comprises a plurality of light-emitting devices distributed evenly.

In certain exemplary embodiments, a diffusion sheet or diffusion plate is further arranged on a side of the view angle controller close to the first light source component.

In certain exemplary embodiments, the first light source component is arranged at a light entrance side of the second light source component, and a reflective sheet is further arranged on a side of the second light source component opposite to a light exit side.

In certain exemplary embodiments, the view angle controller is a light alignment film. In particular, light emitted from the light alignment film is collimated light.

According to another aspect of this disclosure, a method for controlling the above backlight module is provided. The controlling method comprises: upon receipt of a first control instruction, switching on the first light source component so as to provide a first backlight (hereinafter also referred to as a first view angle backlight) through the first light exit region; and upon receipt of a second control instruction, switching on the first light source component and the second light source component simultaneously so as to provide a second backlight (hereinafter also referred to as a second view angle backlight) through both the first light exit region and the second light exit region.

According to yet another aspect of this disclosure, a device for controlling the above backlight module is provided. The controlling device comprises a receiving unit and a control unit connected with the receiving unit. The receiving unit is used for receiving a control instruction and sending the control instruction to the control unit. The control instruction comprises a first control instruction or a second control instruction. The control unit is used for: upon receipt of the first control instruction, switching on the first light source component through the switch control end for the first light source component so as to provide a first view angle backlight or a first backlight through the first light exit region; and upon receipt of the second control instruction, switching on simultaneously the first light source component through the switch control end for the first light source component and the second light source component through the switch control end for the second light source component so as to provide a second view angle backlight or a second backlight through both the first light exit region and the second light exit region.

According to still another aspect of this disclosure, a display device is provided. The display device comprises a backlight module mentioned above and a device for controlling the backlight module.

Embodiments of this disclosure provide a backlight module, a control method and control device therefor, and a corresponding display device. A light exit region of the backlight module comprises a first light exit region (also referred to as an initial view angle region) and a second light exit region (also referred to as a view angle compensation region) located on a periphery of the first light exit region. The backlight module comprises a first light source component and a second light source component. Light emitted from the first light source component is emitted out through the initial view angle region. Light emitted from the second light source component is emitted out at least through the view angle compensation region. Besides, a switch control end for the first light source component and a switch control end for the second light source component are not electrically connected.

In this case, when narrow view angle display is needed, one can switch on only the first light source component in the backlight module through the switch control end for the first light source component. Now, light emitted from the first light source component is emitted out from the initial view angle region, such that the backlight module can provide a first view angle backlight for use in the narrow view angle display. In contrast, when wide view angle display is needed, one can switch on simultaneously the first light source component through the switch control end for the first light source component and the second light source component through the switch control end for the second light source component. Now, since light emitted from the second light source component can be at least emitted out from the view angle compensation region, compensation can be made for the first view angle backlight by using light emitted out from the view angle compensation region, such that the backlight module can provide a second view angle backlight for use in the wide view angle display. In this way, when the backlight module is applied to a display device, switching between a narrow view angle and a wide view angle can be achieved by switching backlight ranges provided by the backlight module. The user does not need to additionally carry any auxiliary tools during the above switching, which improves the user's convenience in use.

BRIEF DESCRIPTION OF DRAWINGS

In order to illustrate technical solutions of embodiments of this disclosure more clearly, drawings to be used in depictions of these embodiments will be introduced briefly as follows. Apparently, the drawings in these depictions below are only some embodiments of this disclosure. For a person having ordinary skills in the art, other embodiments can also be obtained from these drawings without any inventive efforts.

DETAILED DESCRIPTION OF EMBODIMENTS

Figure 1A:
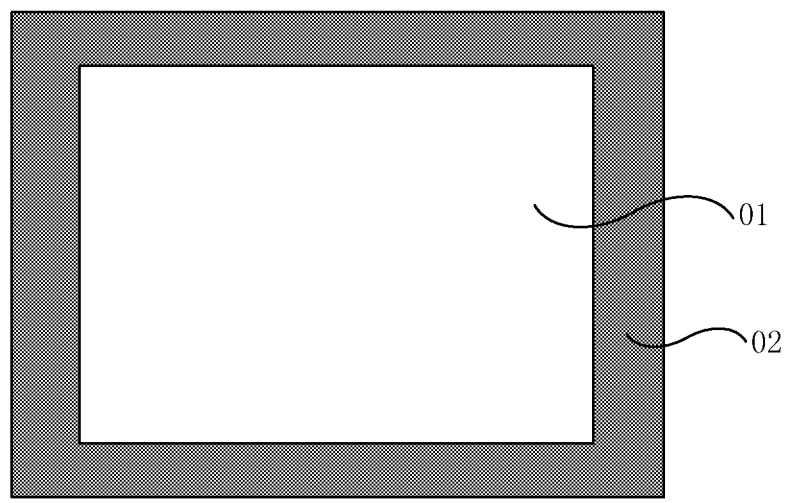
FIG. 1a is a schematic view for a light exit region of a backlight module according to an embodiment of this disclosure.

Technical solutions in embodiments of this disclosure shall be described clearly and completely as follows with reference to the drawings. Apparently, the embodiments as described below are only part of the embodiments of this disclosure, rather than all of them. Based on the embodiments in this disclosure, all other embodiments obtainable by a person having ordinary skills in the art without any inventive efforts shall fall within the protection scope of this disclosure.

In the drawings, various elements are indicated by reference signs as follows: 01—first light exit region or initial view angle region; 02—second light exit region or view angle compensation region; 10—first light source component; 11, 11'—first microstructure, second microstructure or third microstructure; 101—first light guide unit; 102—first sub-light source; 20—second light source component; 201—second light guide unit; 202—second sub-light source; 30—view angle controller; 40—diffusion sheet or diffusion plate; 50—reflective sheet; 60—first light-emitting device or second light-emitting device; 300—receiving unit; and 301—control unit.

Embodiments of this disclosure provide a backlight module. As shown in FIG. 1a, a light exit region of the backlight module can be divided into an initial view angle region or a first light exit region 01, and a view angle compensation region or a second light exit region 02 located on a periphery of the initial view angle region 01. Specifically, the light exit region of the backlight module refers to a region in the backlight module that actually enables light emission therefrom. Since it is also necessary to arrange in the backlight module a driving part or a part for providing a light source, positions where the above parts are arranged do not fall within the light exit region.

Figure 1B:
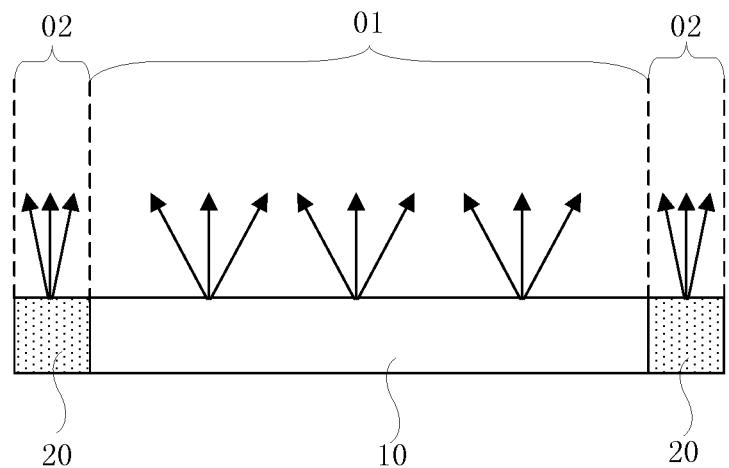
FIG. 1b is a schematic structure view for a backlight module according to an embodiment of this disclosure.

In this case, the backlight module comprises a first light source component and a second light source component. Specifically, as shown in FIG. 1b, the first light source component 10 is arranged for corresponding to the initial view angle region 01, and the second light source component 20 can be arranged for corresponding to the view angle compensation region 02, i.e., it can be arranged on a periphery of the first light source component 10.

Figure 1C:
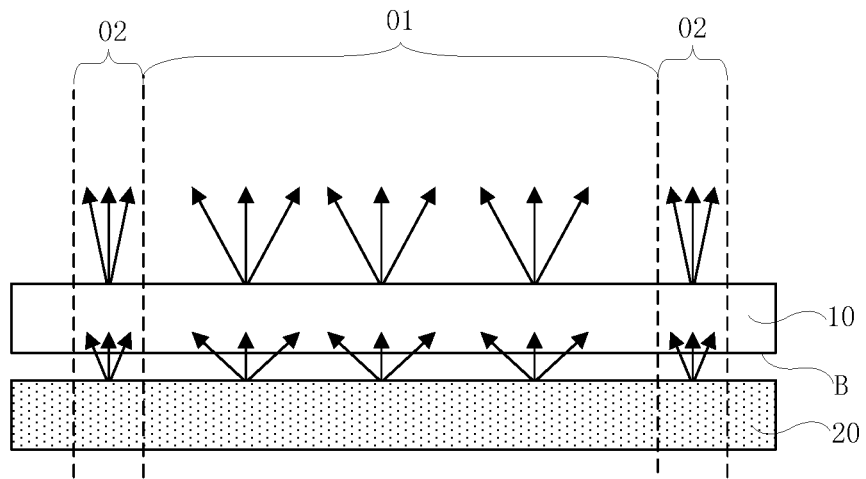
FIG. 1c is a schematic structure view for another backlight module according to an embodiment of this disclosure.

Alternatively, as shown in FIG. 1c, the second light source component 20 is arranged on a side B of the first light source component 10 opposite to a light exit side.

Arrangements of the first light source component 10 and the second light source component 20 will not be limited in this disclosure, as long as it can be ensured that light emitted from the first light source component 10 is emitted out from the initial view angle region 01 and light emitted from the second light source component 20 is at least emitted out from the view angle compensation region 02. Specifically, the expression of "light emitted from the second light source component 20 is at least emitted out from the view angle compensation region 02" means that the light emitted from the second light source component 20 can be only emitted out from the view angle compensation region 02 (as shown in FIG. 1b), or part of the light emitted from the second light source component 20 can be emitted out from the initial view angle region 01 and the remaining of it can be emitted out from the view angle compensation region 02, as shown in FIG. 1c.

Besides, a switch control end for the first light source component 10 and a switch control end for the second light source component 20 are not electrically connected. This means that the switch control end for the first light source component 10 and the switch control end for the second light source component 20 are two switch control ends that perform control independently. That is, when the ON and OFF states of the first light source component 10 are controlled through the switch control end for the first light source component 10, the ON or OFF state of the second light source component 20 will not be influenced. Likewise, when the ON and OFF states of the second light source component 20 are controlled through the switch control end for the second light source component 20, the ON or OFF state of the first light source component 10 will not be influenced. In this way, the ON and OFF states of the first light source component 10 and the second light source component 20 can be controlled independently.

As an example, when the first light source component 10 is switched on and the second light source component 20 is switched off, the switch control end for the first light source component 10 controls the first light source component 10 to be switched on, and the switch control end for the second light source component 20 controls the second light source component 20 to be switched off.

As another example, when the first light source component 10 and the second light source component 20 need to be switched on simultaneously, the switch control end for the first light source component 10 controls the first light source component 10 to be switched on, and at the same time the switch control end for the second light source component 20 controls the second light source component 20 to be switched on.

In summary, when narrow view angle display is needed, one can switch on only the first light source component in the backlight module through the switch control end for the first light source component. Light emitted from the first light source component is emitted out from the initial view angle region, such that the backlight module can provide a first view angle backlight for use in the narrow view angle display. When wide view angle display is needed, one can switch on simultaneously the first light source component through the switch control end for the first light source component and the second light source component through the switch control end for the second light source component. Since light emitted from the second light source component can be at least emitted out from the view angle compensation region, compensation can be made for the first view angle backlight by using light emitted out from the view angle compensation region, such that the backlight module can provide a second view angle backlight for use in the wide view angle display. In this way, when the backlight module is applied to a display device, the display device can achieve switching between a narrow view angle and a wide view angle by switching backlight ranges provided by the backlight module. The user does not need to additionally carry any auxiliary tools during the above switching, which improves the user's convenience in use.

Figure 2:
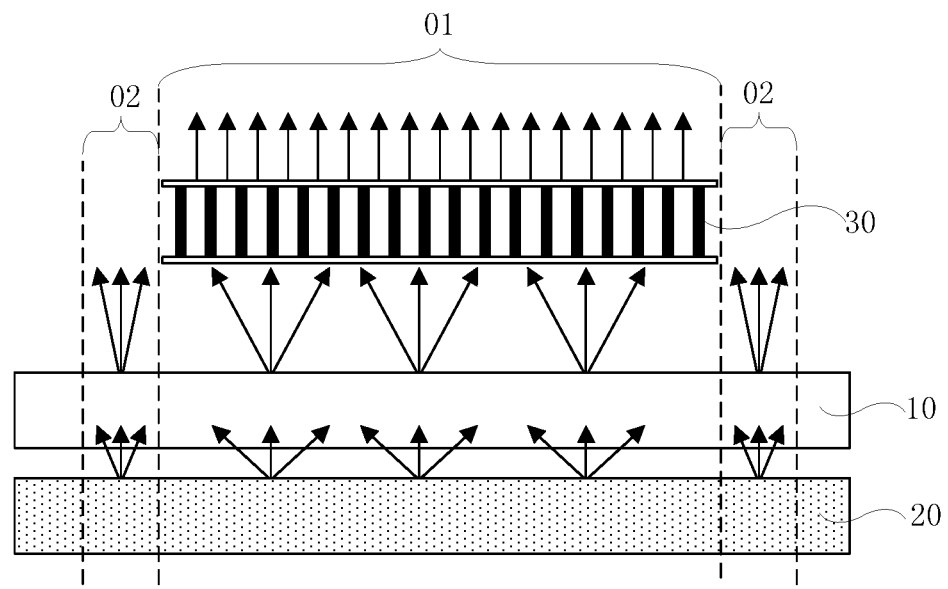
FIG. 2 is a schematic structure view for the backlight module in FIG. 1c, which is further provided with a view angle controller.

Furthermore, in order to control the direction of light emitted from the initial view angle region 01, in certain exemplary embodiments, the backlight module can further comprise a view angle controller 30 arranged within the initial view angle region 01, as shown in FIG. 2. Now, light emitted from the first light source component 10 is emitted into the view angle controller 30 and emitted out from a light exit side of the view angle controller 30 as parallel light. In this way, light can be all emitted out in a same direction, which improves control accuracy of the view angle. Based on that, furthermore in certain exemplary embodiments, the view angle controller 30 can be a light alignment film. Light emitted out from the light alignment film is collimated light. Accordingly, when narrow view display is needed, the user will be able to see a clearest narrow view angle images, as long as he/she faces a central position of the display pane. This complies with the user's viewing habits.

Specific structures for the first light source component 10 and the second light source component 20 will be illustrated below in detail by using examples.

According to a specific embodiment, the backlight module can be an edge type of backlight module.

Figure 3:
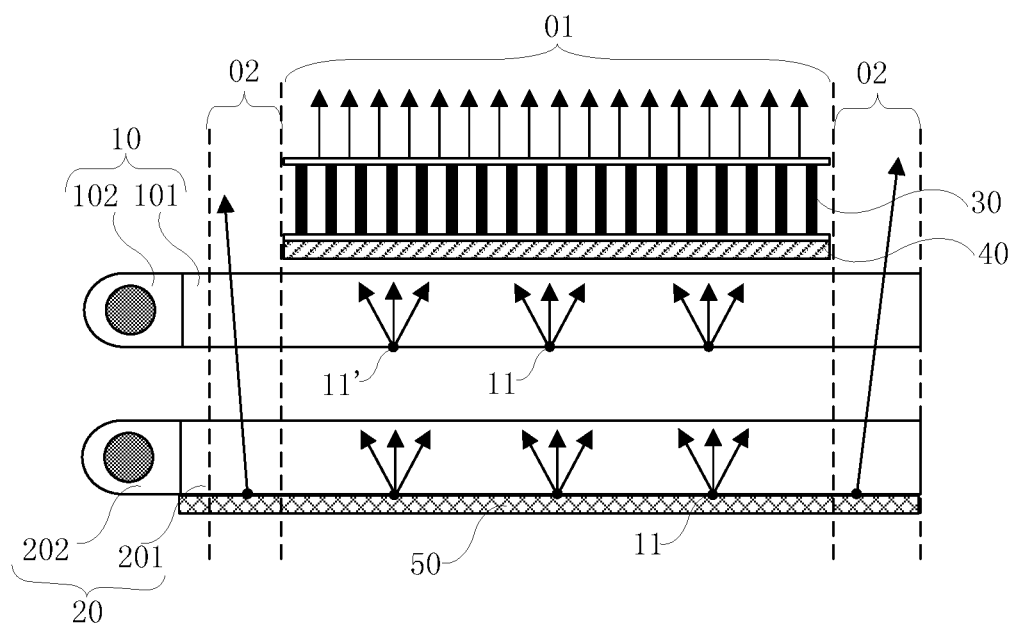
FIG. 3 is a schematic structure view for a first light source component and a second light source component in FIG. 2.

As shown in FIG. 3, the first light source component 10 comprises a first light guide unit 101, and a first sub-light source 102 arranged at a light entrance side of the first light guide unit 101. The first light guide unit 101 further comprises a first microstructure 11. The first microstructure 11 is arranged on a side of the first light guide unit 101 facing away from the view angle controller 30, and configured to redirect light received from the first sub-light source 102 towards the initial view angle region 01.

It should be noted that in this embodiment, light emitted from a light exit side of the first light guide unit 101 needs to be all emitted into the view angle controller 30, in order to have light emitted from the first light source component 10 be emitted out from the initial view angle region 01. Specifically, it is only necessary to ensure that light guided out by the first microstructure 11' in the first light guide unit 101 can be emitted into the view angle controller 30. In order to achieve the above goal, typically, a region in the first light guide unit 101 where the first microstructure is arranged needs to be completely covered by the view angle controller

30. That is, the region in the first light guide unit 101 where the first microstructure is arranged corresponds to the view angle controller 30 vertically in terms of position. Besides, the region in the first light guide unit 101 where the first microstructure is arranged has a smaller area than the view angle controller 30.

Specifically, directional terms such as "up" and "down" herein are defined with respect to schematic placements of the backlight module in the drawings. It should be understood that these directional terms are relative concepts. They are only used for relative description and clarification. They can be varied with the orientation in which the backlight module is placed.

Besides, the second light source component 20 comprises a second light guide unit 201, and a second sub-light source 202 arranged at a light entrance side of the second light guide unit 201. The second light guide unit 201 further comprises a second microstructure 11. The second microstructure 11 is arranged on a side of the second light guide unit 201 facing away from the view angle controller 30, and configured to redirect at least part of light received from the second sub-light source 202 towards the view angle compensation region 02.

Specifically, the second microstructure 11 can be arranged for corresponding to only the view angle compensation region 02. Alternatively, the second microstructure 11 can also be arranged for corresponding to both the view angle compensation region 02 and the initial view angle region 01.

In this way, when narrow view angle display is needed, only the first sub-light source 102 can be switched on. Accordingly, light emitted from the first sub-light source 102 is emitted out from only the initial view angle region 01 under an effect of the first light guide unit 101. By doing this, the backlight module can provide a first view angle backlight for use in the narrow view angle display. Correspondingly, when wide view angle display is needed, the first sub-light source 102 and the second sub-light source 202 can be switched on simultaneously. In this way, light emitted from the second sub-light source 202 can be at least emitted out from the view angle compensation region 02 under an effect of the second light guide unit 201, thereby compensating for the first view angle backlight. In this way, the backlight module can provide a second view angle backlight for use in the wide view angle display.

Figure 4:
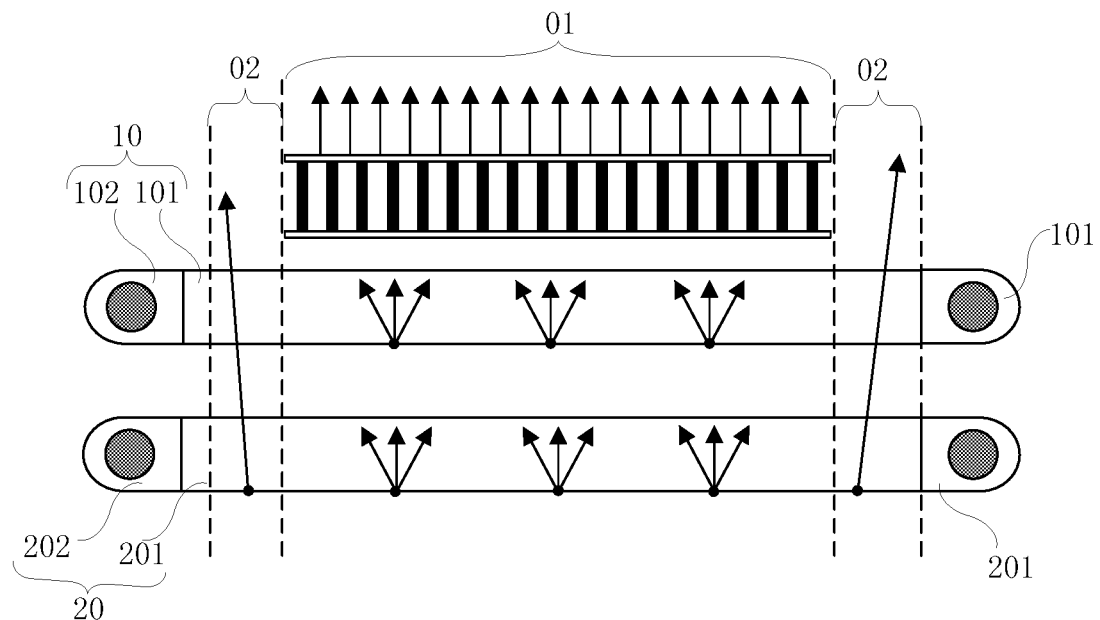
FIG. 4 is another schematic structure view for a first light source component and a second light source component in FIG. 2.

It should be noted that for the light entrance sides of the first light guide unit 101 and the second light guide unit 201, as shown in FIG. 3, either side can be a light entrance side; alternatively, as shown in FIG. 4, the sub-light sources can be further arranged on both sides of the light guide units. As a result, both sides of the light guide units are light entrance sides.

Based on that, as shown in FIG. 3, corresponding to the initial view angle region 01, a diffusion sheet or diffusion plate 40 can be further arranged on a side of the view angle controller 30 close to the first light source component 101. By doing this, uniformity of the light emitted out from the first light guide unit 101 is further improved. Moreover, when the second microstructure 11, corresponding to the first and second light exit regions, is arranged on a side of the second light guide unit 201 facing away from the view angle controller 30, uniformity of the light emitted out from the second light guide unit 201 can be further improved. In this way, linear light emitted out from the light guide units can be evenly diffused into planar light under a diffusion effect of the diffusion sheet or diffusion plate 40. Then, the planar light is emitted into the view angle controller 30 such that the parallel light emitted out from the view angle controller 30 is diffused more evenly.

Furthermore, when the first light source component 10 is arranged at the light entrance side of the second light source component 20, a reflective sheet can be further arranged on a side of the second light source component 20 opposite to the light exit side, so as to improve the light utilization. For the solution provided in this embodiment, as shown in FIG. 3, the reflective sheet 50 can be arranged on a side of the second light guide unit 201 opposite to the light exit side. Theoretically, light within the light guide units can be only emitted out of the light guide units from a position corresponding to the microstructure 11, and all light in other positions will be totally reflected within the light guide units. However, during actual productions and applications, due to influences by materials of the light guide unit and manufacture processes, a small amount of light will also be emitted out of the light guide units from a position where no microstructure 11 is arranged. In this case, when the reflective sheet 50 is arranged on a side of the second light guide unit 201 opposite to the light exit side, light emitted out of the light guide units will be reflected back into the light guide units, which improves the light utilization.

Figure 5:
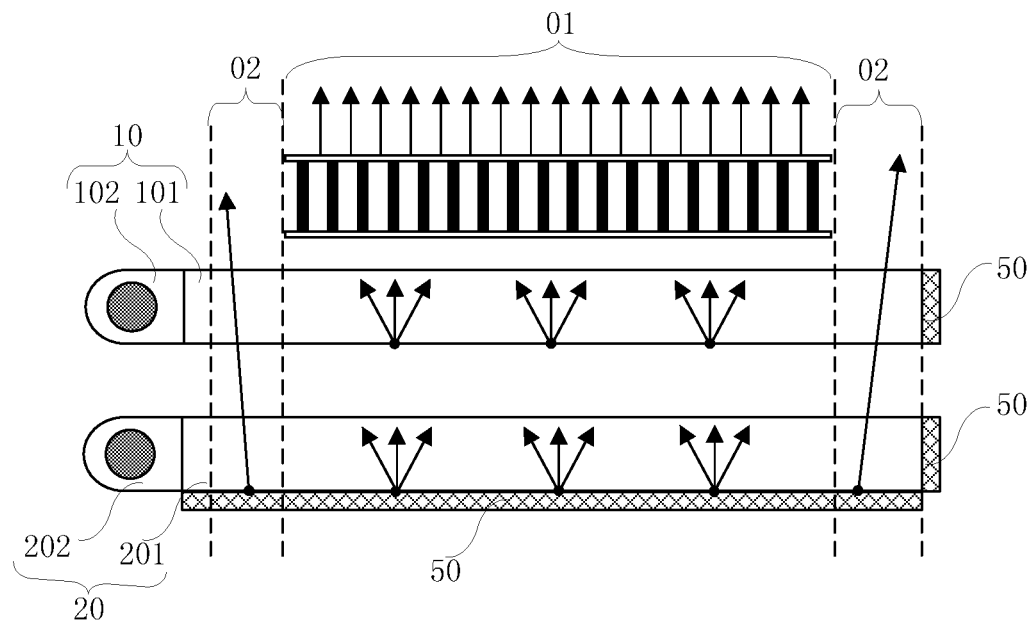
FIG. 5 is yet another schematic structure view for a first light source component and a second light source component in FIG. 2.

Based on that, as shown in FIG. 5, when the first sub-light source 102 is arranged only on one side of the first light guide unit 101, and the second sub-light source 202 is also arranged only on one side of the second light guide unit 201, the reflective sheet 50 can be arranged in the light guide units opposite to the sub-light sources. In this way, the light utilization can be further improved.

According to another embodiment of this disclosure, the backlight module can be an edge type of backlight module. Now, the first light source component 10 has a same structure as that in the above embodiment.

Figure 6:
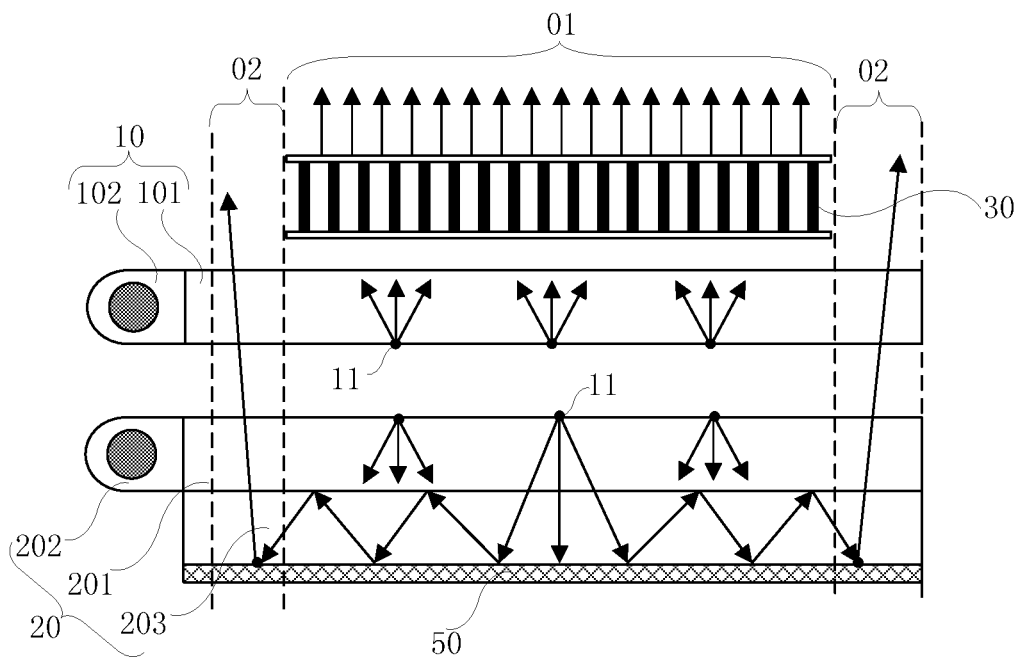
FIG. 6 is still another schematic structure view for a first light source component and a second light source component in FIG. 2.

The difference lies in that, the second light source component 20 comprises a second light guide unit 201, a second sub-light source 202 arranged at a light entrance side of the second light guide unit 201, and a third light guide unit 203 arranged on a side of the second light guide unit 201 facing away from the view angle controller 30, as shown in FIG. 6. The second light guide unit 201 further comprises a second microstructure 11. The second microstructure 11 is arranged on a side of the second light guide unit 201 close to the view angle controller 30, and configured to redirect light received from the second sub-light source 202 towards the third light guide unit 203. In this way, under an effect of the second microstructure 11, light within the second light guide unit 201 can be emitted into the third light guide unit 203.

In this case, the third light guide unit 203 further comprises a third microstructure 11. The third microstructure 11 is arranged on a side of the third light guide unit 203 facing away from the view angle controller 30, and configured to redirect at least part of light received from the second light guide unit 203 towards the view angle compensation region 02.

In this way, when narrow view angle display is needed, only the first sub-light source 102 can be switched on. Accordingly, light emitted from the first sub-light source 102 is emitted out from only the initial view angle region 01 under an effect of the first light guide unit 101. By doing this, the backlight module can provide a first view angle backlight for use in the narrow view angle display. Correspondingly, when wide view angle display is needed, the first sub-light source 102 and the second sub-light source 202 can be switched on simultaneously. In this way, light emitted from the second sub-light source 202 can be at least emitted out from the view angle compensation region 02 under an effect of the second light guide unit 201 and the third light guide unit 203. Thereby, compensation is made for the first view angle backlight such that the backlight module can provide a second view angle backlight for use in the wide view angle display.

Besides, in this embodiment, the diffusion sheet or diffusion plate 40 and the reflective sheet 50 can be arranged in a same manner as that in the above embodiments, which will not be repeated here for simplicity.

According to yet another embodiment of this disclosure, the backlight module can be a direct-lit type of backlight module.

Figure 7:
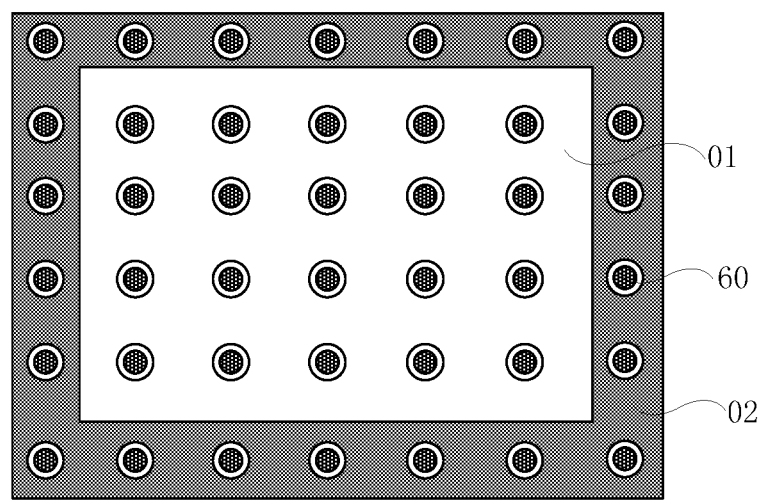
FIG. 7 is a schematic structure view for a direct-lit type of backlight module according to an embodiment of this disclosure.

Specifically, as shown in FIG. 7, the first light source component 10 comprises a plurality of first light-emitting devices 60 distributed evenly. The second light source component 20 comprises a plurality of second light-emitting devices 60 distributed evenly. Specifically, the first and/or second light-emitting devices 60 can be light-emitting diodes. Besides, switching between the narrow view angle and the wide view angle keeps the same as that in any of the above embodiments, which will not be repeated here for simplicity.

Figure 8:
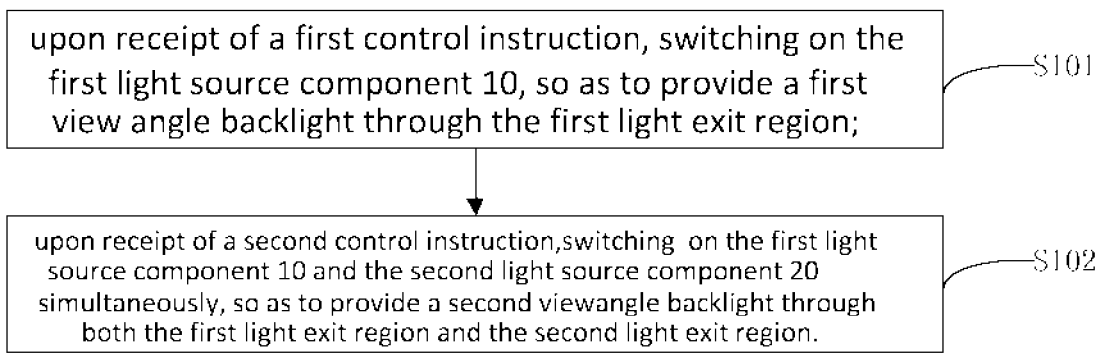
FIG. 8 is a flow diagram of a method for controlling a backlight module according to an embodiment of this disclosure.

Embodiments of this disclosure further provide a method for controlling a backlight module. As shown in FIG. 8, the method comprises the following step: S101, upon receipt of a first control instruction, switching on the first light source component 10 so as to provide a first view angle backlight through the first light exit region; and S102, upon receipt of a second control instruction, switching on the first light source component 10 and the second light source component 20 simultaneously so as to provide a second view angle backlight through both the first light exit region and the second light exit region.

In this way, when narrow view angle display is needed, only the first sub-light source can be switched on. Light emitted from the first light source component is emitted out through the initial view angle region. Thus, the backlight module can provide a first view angle backlight for use in the narrow view angle display. When wide view angle display is needed, the first light source component and the second light source component in the backlight module can be switched on simultaneously. Since light emitted from the second light source component can be at least emitted out from the view angle compensation region, compensation can be made for the first view angle backlight by using light emitted out from the view angle compensation region. By doing this, the backlight module can provide a second view angle backlight for use in the wide view angle display. In this way, when the backlight module is applied to a display device, the display device can achieve switching between a narrow view angle and a wide view angle by switching backlight ranges provided by the backlight module. Since the user does not need to additionally carry any auxiliary tools during the above switching, the user's convenience in use is improved.

Figure 9:
FIG. 9 is a schematic structure view of a device for controlling a backlight module according to an embodiment of this disclosure.

Embodiments of this disclosure further provide a device for controlling a backlight module. The controlling device is connected with the backlight module for achieving switching between the first view angle backlight and the second view angle backlight. Specifically, as shown in FIG. 9, the controlling device can comprise a receiving unit 300 and a control unit 301 connected with the receiving unit 300.

Specifically, the receiving unit 300 is used for receiving a control instruction and sending the control instruction to the control unit 301. Specifically, the control instruction comprises a first control instruction or a second control instruction.

In this case, the control unit 300 is used for switching on the first light source component 10 through the switch control end for the first light source component upon receipt of the first control instruction. Now, light emitted from the first light source component 10 is emitted into the view angle controller 30 and emitted out from a light exit side of the view angle controller 30 as parallel light, so as to provide a first view angle backlight.

Besides, the control unit 300 is further used for switching on simultaneously the first light source component 10 through the switch control end for the first light source component and the second light source component 20 through the switch control end for the second light source component upon receipt of the second control instruction. Now, light emitted from the second light source component 20 at least illuminates the view angle compensation region 02 and compensates for the first view angle backlight, so as to switch the first view angle backlight to the second view angle backlight.

Specifically, the first view angle backlight provided by the backlight module is used for providing backlight to the display panel in narrow view angle display. Correspondingly, the second view angle backlight is used for providing backlight to the display panel in wide view angle display. In this way, when the backlight module is applied to a display device, the display device can achieve switching between a narrow view angle and a wide view angle by switching backlight ranges provided by the backlight module. Since the user does not need to additionally carry any auxiliary tools during the above switching, the user's convenience in use is improved.

Embodiments of this disclosure provide a display device, comprising any of the above mentioned backlight modules and a device for controlling the backlight module. Such a display device has the same structure and beneficial effects as the backlight module and the device for controlling the backlight module provided in any of the aforementioned embodiments. The structure and beneficial effects of the backlight module and the device for controlling the backlight module have been described above in detail in the above embodiments, which will not be repeated here for simplicity.

It should be noted that in embodiments of this disclosure, the display device can specifically comprise a liquid crystal display device. For example, the display device can be any product or component having a display function, such as a liquid crystal display, a liquid crystal television, a digital photo frame, a cellphone or a tablet computer.

The above description is only specific embodiments of this disclosure, but the protection scope of this disclosure is not limited thereto. Any variation or substitution easily conceivable within the technical field disclosed in this disclosure for a skilled person who is familiar with this technical field shall fall within the protection scope of this disclosure. Therefore, the protection scope of this disclosure shall only be subject to the protection scope of the claims.

The invention claimed is:
1. A backlight module, comprising: a first light source component and a second light source component, wherein
light emitted from the first light source component is emitted out through a first light exit region, and light emitted from the second light source component is emitted out at least through a second light exit region, wherein the second light exit region is located on a periphery of the first light exit region;

a switch control end for the first light source component and a switch control end for the second light source component are electrically independent of each other; and the backlight module further comprises: a view angle controller arranged within the first light exit region, wherein light emitted from the first light source component is emitted into the view angle controller and emitted out from a light exit side of the view angle controller as parallel light.

2. The backlight module according to claim 1, wherein the first light source component comprises: a first light guide unit, and a first sub-light source arranged at a light entrance side of the first light guide unit; and the first light guide unit further comprises a first microstructure, wherein the first microstructure is arranged on a side of the first light guide unit facing away from the view angle controller, and configured to redirect light received from the first sub-light source towards the first light exit region.

3. The backlight module according to claim 2, wherein the second light source component comprises: a second light guide unit, and a second sub-light source arranged at a light entrance side of the second light guide unit; and the second light guide unit further comprises a second microstructure, wherein the second microstructure is arranged on a side of the second light guide unit facing away from the view angle controller, and configured to redirect at least part of light received from the second sub-light source towards the second light exit region.

4. The backlight module according to claim 2, wherein the second light source component comprises: a second light guide unit, a second sub-light source arranged at a light entrance side of the second light guide unit, and a third light guide unit arranged on a side of the second light guide unit facing away from the view angle controller;

the second light guide unit further comprises a second microstructure, wherein the second microstructure is arranged on a side of the second light guide unit close to the view angle controller, and configured to redirect light received from the second sub-light source towards the third light guide unit; and the third light guide unit further comprises a third microstructure, wherein the third microstructure is arranged on a side of the third light guide unit facing away from the view angle controller, and configured to redirect at least part of light received from the second light guide unit towards the second light exit region.

5. The backlight module according to claim 1, wherein the second light source component comprises: a second light guide unit, and a second sub-light source arranged at a light entrance side of the second light guide unit; and the second light guide unit further comprises a second microstructure, wherein the second microstructure is arranged on a side of the second light guide unit facing away from the view angle controller, and configured to redirect at least part of light received from the second sub-light source towards the second light exit region.

6. The backlight module according to claim 1, wherein the second light source component comprises: a second light guide unit, a second sub-light source arranged at a light entrance side of the second light guide unit, and a third light guide unit arranged on a side of the second light guide unit facing away from the view angle controller;

the second light guide unit further comprises a second microstructure, wherein the second microstructure is arranged on a side of the second light guide unit close to the view angle controller, and configured to redirect light received from the second sub-light source towards the third light guide unit; and the third light guide unit further comprises a third microstructure, wherein the third microstructure is arranged on a side of the third light guide unit facing away from the view angle controller, and configured to redirect at least part of light received from the second light guide unit towards the second light exit region.

7. The backlight module according to claim 1, wherein the first light source component comprises a plurality of first light-emitting devices distributed evenly, and the second light source component comprises a plurality of second light-emitting devices distributed evenly.

8. The backlight module according to claim 1, wherein a diffusion sheet or diffusion plate is further arranged on a side of the view angle controller close to the first light source component.

9. The backlight module according to claim 1, wherein the first light source component is arranged at a light entrance side of the second light source component, and a reflective sheet is further arranged on a side of the second light source component opposite to a light exit side.

10. The backlight module according to claim 1, wherein the view angle controller comprises a light alignment film.

11. A method for controlling the backlight module according to claim 1, comprising:

upon receipt of a first control instruction, switching on the first light source component so as to provide a first backlight through the first light exit region; and upon receipt of a second control instruction, switching on the first light source component and the second light source component simultaneously so as to provide a second backlight through both the first light exit region and the second light exit region.

12. The method according to claim 11, wherein the first light source component comprises a plurality of first light-emitting devices distributed evenly, and the second light source component comprises a plurality of second light-emitting devices distributed evenly.

13. The method according to claim 11, wherein the first light source component is arranged at a light entrance side of the second light source component, and a reflective sheet is further arranged on a side of the second light source component opposite to a light exit side.

14. A device for controlling the backlight module according to claim 1, comprising: a receiving unit and a control unit connected with the receiving unit; wherein the receiving unit is configured for receiving a control instruction and sending the control instruction to the control unit, the control instruction comprising a first control instruction or a second control instruction; and the control unit is configured for: upon receipt of the first control instruction, switching on the first light source component through the switch control end for the first light source component, so as to provide a first backlight through the first light exit region; and upon receipt of the second control instruction, switching on simultaneously the first light source component through the switch control end for the first light source component and the second light source component through the switch control end for the second light source component, so as to provide a second backlight through both the first light exit region and the second light exit region.

15. The device according to claim 14, wherein
the first light source component comprises a plurality of first light-emitting devices distributed evenly, and
the second light source component comprises a plurality of second light-emitting devices distributed evenly.

16. The device according to claim 14, wherein
the first light source component is arranged at a light entrance side of the second light source component, and
a reflective sheet is further arranged on a side of the second light source component opposite to a light exit side.

\* \* \* \* \*